United States Patent [19]

Galer

[11] 4,059,249
[45] Nov. 22, 1977

[54] INJECTION MOLD FOR MOLDING INTERNALLY THREADED PLASTIC ARTICLE

[75] Inventor: Herbert W. Galer, Newnan, Ga.

[73] Assignee: United States Steel Corporation, Pittsburgh, Pa.

[21] Appl. No.: 755,512

[22] Filed: Dec. 30, 1976

[51] Int. Cl.² .................... B29D 15/00; B29F 1/14
[52] U.S. Cl. ..................................... 249/58; 249/59
[58] Field of Search ................................ 249/58, 59

[56] References Cited

U.S. PATENT DOCUMENTS

| | | | |
|---|---|---|---|
| 3,091,810 | 6/1963 | Turner | 249/59 X |
| 3,289,252 | 12/1966 | Bromley | 249/58 X |
| 3,314,639 | 4/1967 | Barnett | 249/58 |
| 3,481,000 | 12/1969 | Barfuss | 249/59 X |
| 3,660,001 | 5/1972 | Roehr | 249/59 X |
| 3,776,676 | 12/1973 | Kessler | 249/59 X |
| 3,905,416 | 9/1975 | Hammer | 249/59 X |
| 3,940,103 | 2/1976 | Hilaire | 249/59 X |

*Primary Examiner*—J. Howard Flint, Jr.
*Attorney, Agent, or Firm*—Frank Madonia

[57] ABSTRACT

A core for the injection molding of plastic articles having internal threads, provides a means for readily releasing the article from the mold. The core has a non-rotating, water-cooled center section to hold the molded article against rotary motion and a driven, water-cooled ring section for molding threads in the article. Rotation of the ring section coupled with the holding action of the stationary center section releases the molded thread and ejects the article from the core by the axial force of the thread of the core bearing against the molded thread of the article.

2 Claims, 1 Drawing Figure

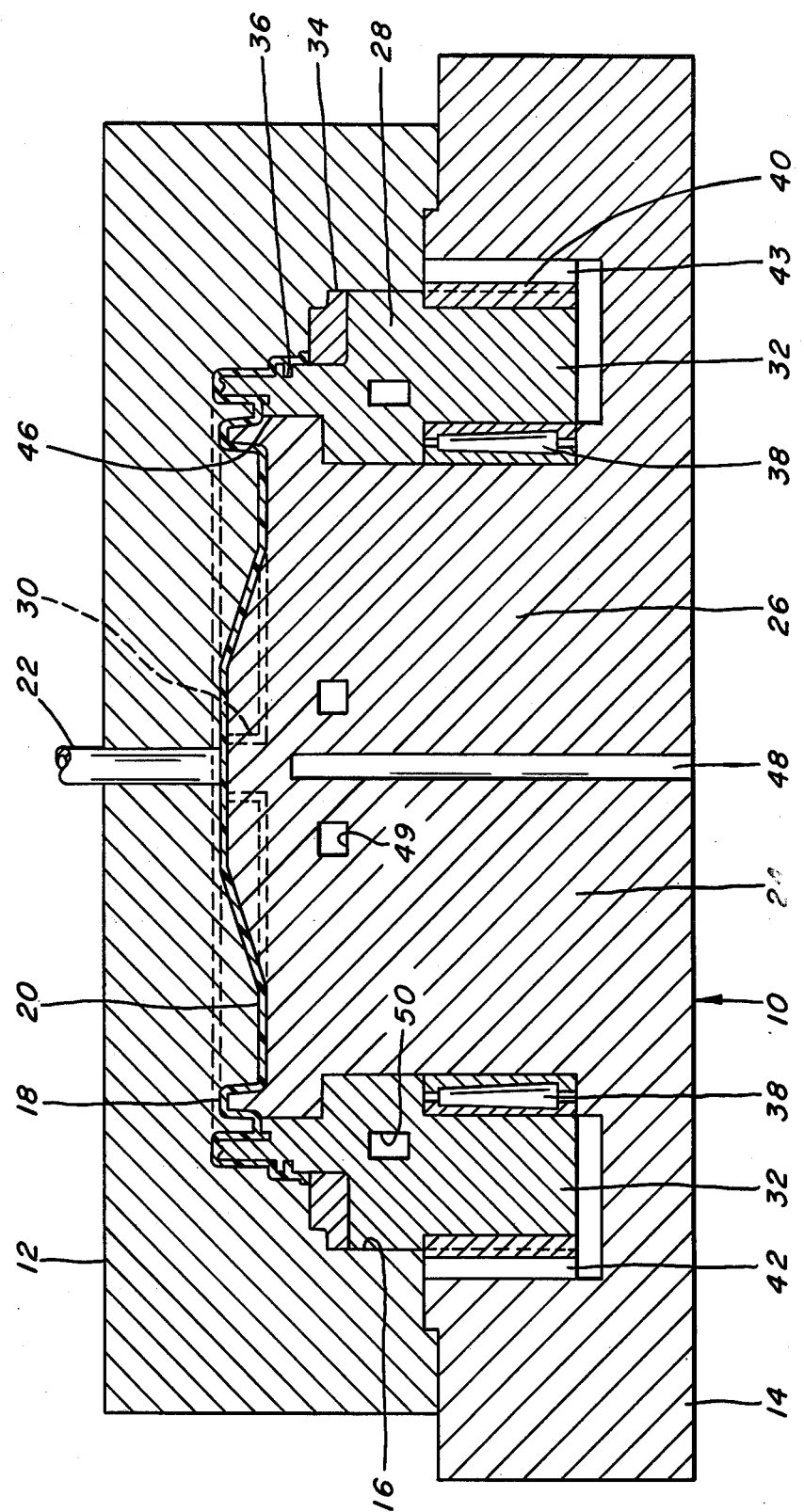

INJECTION MOLD FOR MOLDING INTERNALLY THREADED PLASTIC ARTICLE

BACKGROUND OF THE INVENTION

This invention relates to molding plastic articles which have internal threads. More particularly, it relates to ejecting the articles from the mold core.

When molding internally threaded articles, such as a screw-on lid for a container, the mold core is provided with the depressions which form the resulting internal threads of the article. The resulting mating of the article threads with the core depressions creates a barrier to axial ejection of the article. Before the article may be ejected the core must be disengaged from the article. Various techniques have been employed for removing these articles from their molds. One such technique is to unscrew the core from the article. This technique requires that the article be held immobile so that when the core is rotated, the article does not rotate with it. This has previously been accomplished by the provision of additional molded members on the article for engagement with, for example, the cavity-half of the mold. Once the core is unscrewed from the article, a further step is required to remove the article from the mold. Another drawback of this procedure has been the large amount of wear between rotating core members and non-rotating members.

OBJECTS OF THE INVENTION

It is an object of this invention to combine the steps of removing the core from the article and ejecting the article from the mold and thus more efficiently and quickly mold internally threaded articles.

It is another object of this invention to provide a drive means for the rotating core to reduce the degree of wear between the rotating core members and non-rotating members.

DESCRIPTION OF THE DRAWING

The FIGURE is a sectional elevation view through the mold.

DESCRIPTION OF THE PREFERRED EMBODIMENT

Shown in FIG. 1 is an injection mold 10 having an upper housing 12 and a lower housing 14. Upper housing 12 is provided with a cavity 16 having an upper portion, the surface of which defines the outer surface 18 of molded plastic article 20, and a sprue 22 through which plastic is injected into the space between the upper and lower housing.

Lower housing 14 has a core portion 24, the topmost surface of which defines the internal surface of the molded article 20. Core 24 includes a stationary portion 26 and a rotatable portion 28. Stationary portion 26 has a raised rod-like center section 30 which forms a handle-like protrusion to be molded in the article. The term rod-like as used herein to connote an elongate-shaped article of various cross-sections and is not limited to any specific cross-section such as a circle, square or rectangle. This handle-like protrusion serves a dual purpose. Its first purpose is that of a handle for the molded article, e.g. a container top, by which the article may be detached from the corresponding male member, e.g. the container itself (not shown). Its other purpose is to provide a means, in accord with the teachings of this invention, for holding the article against rotation during ejection.

Rotatable portion 28 comprises rotating ring 32 and slip-ring 34. Rotating ring 32 is provided with depressions 36, which form the internal threads of article 20. Ring 32 is journaled with stationary portion 26 through thrust bearing 38. Spur gear 40 surrounds the outer periphery of rotating ring 32. Spur gear 40 meshes with gear racks 42. Dual gear racks 42 and 43 are driven in cooperation to rotate ring 32. Through the use of this dual gear rack arrangement, the thrust force generated by one rack acting against one side of the gear ring is offset by the thrust force generated by the gear rack on the opposite side of the gear ring, thereby virtually eliminating wear between the stationary and rotating portions. For example, the high tolerance requirement, e.g. of about 0.0015 to 0.0020 inches, dictated by the high pressures of injection molding may easily be maintained between stationary portion 26 and rotating ring 32 of the core at surface 46, by utilizing an initial tolerance of 0.0015 inch.

Slip ring 34 may be employed to form notches or ribs in the bottom surface of the side wall of article 20. The slip ring will rotate with the rotating ring unless, as noted above, it is desired to form notches or ribs, in which case rotation of the ring will be prevented. Chambers, e.g., 48, 49 and 50 may be provided in the upper housing and the core for conducting coolant.

OPERATION OF THE INVENTION

When the article 20 is set, upper housing 12 is lifted, exposing the article in place on core 24. At this point, gear racks 42 are actuated to cause ring 32 to rotate with respect to the internal threads of the article formed in depressions 36. Stationary portion 26 in contact with the handle-like protrusion of the article, prevents rotation of the article with ring 32. However, article 20 is free to move axially (vertically as shown in the Figure) away from stationary portion 26. As ring 32 rotates, the axial force of the ring bearing against the internal threads of the article causes it to move axially away from core 24, thereby ejecting it.

The embodiment of the invention described above is for illustration purposes only. Other embodiments are envisioned which lie within the scope of the invention as defined in the following claims.

I claim:

1. Apparatus for the injection molding of plastic articles having a threaded hollow therein, including means for the ready release of said article when the plastic has been set, said apparatus including,
   a. a housing having a cavity therein, said cavity being formed by matable upper housing and lower housing elements which provide a substantially liquid tight enclosure at the matable surfaces thereof, said upper housing element having (i) a sprue therein for the admission of plastic feed into the cavity, (ii) an approximately planar central bottom surface serving as the boundary forming the central part of the top surface of said article, and (iii) a rim bottom surface serving as the boundary forming the rim part of the top surface of said article,
   b. said lower housing element having a cylindrical core member fixably connected thereto, said core member having a top surface the vertical axis of said core member intersecting the midpoint of said upper housing element central bottom surface, the top surface of the core member serving as the boundary forming a central part of the bottom surface of said article, said core member top surface having a horizontally disposed, rod-like protrusion (i) affixed thereto, perpendicular to the core vertical axis and (ii) lying approximately within the bounds of said upper housing element central bottom surface, said rod-like protrusion acting to form a handle-like portion of said article, c. contiguous to and surrounding circular portion of the core member, an annular element journaled for rotation about the core member, at least a portion of the top surface of said annular element serving as the boundary forming the rim portion of the bottom surface of said article; the vertical, outer surface of said annular element (i) serving as the boundary forming a vertical portion of the hollow of said article, and (ii) having depressions therein acting to form the threads of the hollow, d. means for rotating said annular member.

2. Apparatus as defined in claim 1 wherein said rotating means comprises a gear attached to the outer periphery of said annular member and a pair of cooperating drive gear racks tangentially disposed for engagement with said gear along opposite sides thereof.

* * * * *

UNITED STATES PATENT OFFICE
CERTIFICATE OF CORRECTION

Patent No. 4,059,249            Dated November 22, 1977

Inventor(s) Herbert W. Galer

It is certified that error appears in the above-identified patent and that said Letters Patent are hereby corrected as shown below:

Column 2, line 65, claim 1, after "surface" insert a comma -- , --.

Column 3, line 9, claim 1, after "surrounding" insert

-- a --.

Signed and Sealed this

*Fifteenth* Day of *January 1980*

[SEAL]

*Attest:*

SIDNEY A. DIAMOND

*Attesting Officer*      *Commissioner of Patents and Trademarks*